United States Patent Office 3,344,108
Patented Sept. 26, 1967

3,344,108
POLYMERIC POLYHEDRAL BORANE COMPLEXES
William C. Drinkard, Jr., Wilmington, Del., assignor to E. I. du Pont de Nemours and Company, Wilmington, Del., a corporation of Delaware
No Drawing. Filed Oct. 23, 1963, Ser. No. 318,447
22 Claims. (Cl. 260—47)

This invention relates to novel boron-containing polymers and their preparation. More specifically, the invention concerns neutral, nonionic polymers prepared from $B_{10}$ and $B_{12}$ boron-cage compounds and bis(Lewis bases).

The many uses of polymers have stimulated a search for new ones superior to or markedly different from those already known, and with the recent discovery of $B_{10}H_{10}^=$ and $B_{12}H_{12}^=$ boron-cage anions and their substitution derivatives, interest in the preparation of polymers containing the above-mentioned boron cages has arisen.

There have now been prepared new types of polymers containing neutral polyboron $B_{10}$ or $B_{12}$ cages. The polymers of the present invention contain recurring units of the formula (1) 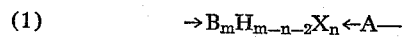

where $m$ is 10 or 12, $n$ is a cardinal number of from 0 up to and including $m-2$, X is halogen or aliphatically saturated hydrocarbyl, i.e., hydrocarbyl free of aliphatic unsaturation, and is bonded to boron of the boron cage, and A is a bis-carboxamide, bis-sulfonamide, bis(thio ether), bisdisulfide, bis-sulfone, or when $m$ is 10, a diamine or dinitrile. Thus A is a difunctional Lewis base type organic moiety capable of independent existence that is bonded to the boron cage through coordination bonds, i.e., a compound that can donate two pairs of electrons, one pair from each functional group.

Alternatively, the polymers of the invention may be described as polymers containing recurring units of the formula (2) 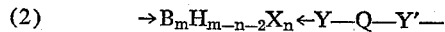

where $m$, $n$ and X are defined as above, Y and Y' can be the same or different, preferably the same, and may be

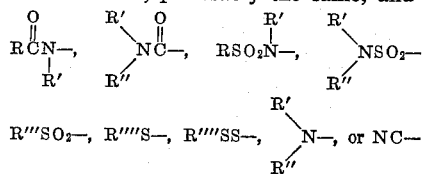

R and R' are hydrogen or hydrocarbyl free of aliphatic unsaturation. R and R' can be joined together to form an alkylene radical of 2–6 carbon atoms. R is preferably of 1–11 carbon atoms, while R' is preferably of 1–12 carbon atoms.

R'' is hydrogen or hydrocarbyl free of aliphatic unsaturation of 1–12 carbon atoms bonded through aliphatic carbon. Because of availability, preferred R, R', and R'' groups are hydrogen or lower alkyl.

R''' is hydrocarbyl free of aliphatic unsaturation of 1–12 carbons and preferably is lower alkyl.

R'''' is of at most 12 carbons and is hydrocarbyl or substituted hydrocarbyl free of aliphatic unsaturation. Preferably it is lower alkyl, aryl, aralkyl or alkaryl in which any substituent is bonded to aromatic carbon. Examples of substituents include halogen, hydroxyl, hydrocarbyloxy, amino, monosubstituted amino, disubstituted amino, carboxyl, hydrocarbylcarbonyl and hydrocarbylsulfonyl. Preferred substituents are halogen and amino, and most preferably, chlorine.

The term "hydrocarbyl free of aliphatic unsaturation" used herein means hydrocarbyl groups in which any unsaturation is aromatic, i.e., aliphatically saturated hydrocarbyl, and includes alkyl, cycloalkyl, alkylcycloalkyl, cycloalkylalkyl, aryl, aralkyl, akaryl or alkaralkyl groups.

Most preferred Y and Y' groups are the thio ethers (R''''S—).

The X substituent described in Formulas 1 and 2 is preferably halogen, i.e. fluorine, chlorine, bromine or iodine (most preferably, chlorine) or hydrocarbyl free of aliphatic unsaturation (most preferably, alkyl or cycloalkyl of up to 12 carbon atoms, particularly lower alkyl). When $n$ is more than 1, the X groups may be the same or different; however, at most only two hydrocarbyl groups may be present.

Q is a divalent hydrocarbyl radical free of acetylenic and allenic unsaturation, and, when Y or Y' are other than R''''S, free of any aliphatic unsaturation, which radical may be interrupted by an oxygen atom, and, when $m$ is 10 and Y and Y' are R''''S—, by (preferably at most four) carbonyloxy

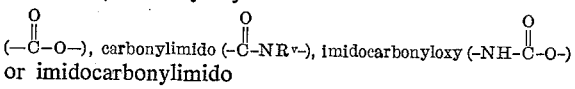

groups, where $R^v$ is hydrogen or lower alkyl, preferably hydrogen. When there is more than one interrupting group present, they can be the same or different. When the expression "hydrocarbyl . . . which may be interrupted by an oxygen atom" or an equivalent expression is used, it includes hydrocarbyl groups and oxygen-interrupted hydrocarbyl groups, e.g. —R—O—R—.

In addition, when the component Y—Q—Y' is a diamine, or a biscarboxamide or a bis-sulfonamide thereof, i.e., when Y and Y' are

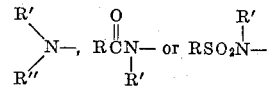

the portion of the molecule represented by Q may comprise two or three divalent hydrocarbyl radicals of the type defined above, particularly two or three lower alkylene radicals ("alkylene," as used here, means a divalent, acyclic, saturated aliphatic hydrocarbyl radical, e.g., ethylene, —CH$_2$CH$_2$—). That is, an R' group of Y and an R' group of Y', and/or an R'' group of Y and an R'' group of Y' can be joined together to form one or two such divalent radicals. Examples of such Y—Q—Y' compounds are

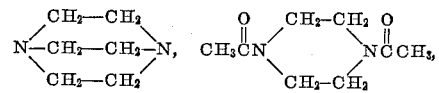

and

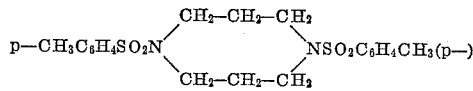

Q may range from 1 to 24 carbon atoms. Preferably Q is divalent hydrocarbyl free of aliphatic unsaturation and ranges from 4 to 18 carbon atoms.

The polymers of the invention may be prepared by a variety of processes. These processes may be divided into two main types of reactions:

A. Those in which the polyboron moiety is changed from an anionic moiety to a neutral moiety in the course of the polymerization reaction. This type of reaction includes: (1) those in which the change from an anionic to a neutral species involves primarily a reaction of the boron cage (Process II, below); (2) those in which the change involves primarily a reaction of a substituent on an anionic boron cage (Processes III and IV).

B. Those in which the polyboron moiety is already neutral in the starting material and remains neutral in the polymerization reaction. This type of reaction includes: (1) reactions in which the neutralizing functions of the neutralizing substituents on the polyboron moiety remain unchanged in the polymerization reaction (Process V); (2) reactions in which the neutralizing substituents are exchanged for other, similarly neutralizing substituents (Process I).

*Process I.*—Polymers of the invention in which the A component is a biscarboxamide, bis-sulfonamide, bis-(thio ether), bisdisulfide, bis-sulfone, diamine or dinitrile can be prepared by the reacting a compound of the formula (3) $\quad B_m H_{m-n-2} X_n Z_2$ where $m$, $n$ and $X$ are as previously defined and Z is an N,N′-disubstituted carboxamide or when $m$ is 10, a diazonium group, with a compound defined as Y—Q′—Y′ wherein Q′ is a divalent hydrocarbyl group free of aliphatic unsaturation which may be interrupted by an oxygen (—O—) atom, and Y and Y′ are as previously defined.

Preferred Z components when it is the carboxamide group include 1-(lower alkyl)-2-pyrolidones and di (lower alkyl) amides of lower alkanoic acids. These are preferred due to their availability and reactivity.

The reaction may be conducted in the absence of a solvent, although one may be used if desired. The temperature may range from 80° to about 250° C., preferably it will range between 100°–150° C. However, when the polyboron reactant is highly halogenated, e.g., $$B_{10}Cl_8(N_2)_2$$

the reaction is operable at lower temperature, e.g., 25° C.

*Process II.*—The polymers of the invention may be prepared by reacting a bis(Lewis base) of the formula Y₁—Q′—Y₁′ with a compound of the formula (4) $\quad M_2 B_m H_{m-n} X_n$ X, $m$, $n$ and Q′ are as previously defined. Y₁ and Y₁′ are preferably the same and may be

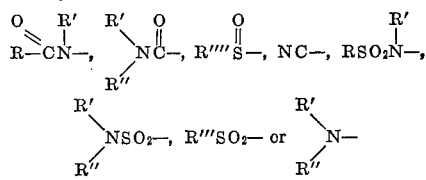

The use of a solvent is not necessary to the operability of the process. When the bis(Lewis base) reactant is a bis-sulfoxide, it is advantageous to use a lower alkanoic acid solvent, e.g., acetic or propionic acid. In this embodiment there is used an acid catalyst having a pKa of at most two (preferably a strong mineral acid such as hydrochloric or sulfuric).

Ordinarily, the reaction is carried out between 80° C. and 250° C., preferably between 100° C. and 200° C. However, temperatures as low as about 25° C. are operable when one uses a lower alkanoic acid/sulfuric acid solvent in which the sulfuric acid is present in greater than catalytic amounts, e.g., at least about 10% by weight. Coreactants that can be used in such systems are biscarboxamides, bis-sulfonamides, and bis-sulfones. Such a solvent system is illustrated in the second part of Example 13.

Preferably Q′ contains 1–18 carbon atoms and may be, for example, alkylene, arylene, alkylenearylene (e.g., methylenephenylene, —CH₂C₆H₄—); alkylenearylenealkylene (e.g., methylenephenylenemethylene,

—CH₂C₆H₄CH₂—)

and arylenealkylenearylene (e.g., phenylenemethylenephenylene, —C₆H₄CH₂C₆H₄—). Most preferably, Q′ is alkylene or arylene of 1–10 carbon atoms. Examples of Q′ include octadecamethylene, 1,3-cyclohexylene, 1,4-cyclohexylenedimethylene, 2,2-dimethyltrimethylene, 1,4-naphthylene, 4,4′-oxydiphenylene, 9,10-anthrylene, 4,4′-ethylenediphenylene, 2-ethylhexamethylene, o-phenylenebistrimethylene and oxybistetramethylene.

M in Formua 4 is a cation used to fulfill the valence of the boron-cage anion. Since M does not appear in the polymeric product, it is not critical and may be any of the following: hydrogen, ammonium or mono-, di-, or tri-substituted ammonium in which the substituents are hydrocarbyl of up to 12 carbons free of aliphatic unsaturation and in which at most only one such substituent is aryl. Preferably, all substituents are lower alkyl groups.

The reactants of Formula 4 in which M is hydrogen are ordinarily isolated as solvates. Since these compounds are most commonly worked with in aqueous media, the most common types of solvates are hydrates. The exact position of attachment of the solvate molecules is not known, but at least some of them are almost certainly associated with the hydrogen ions. It is to be understood, therefore, that the term "hydrogen," as used here, includes, and in fact essentially always refers to, hydrogen ions solvated with water or other solvent molecules. Specifically, it includes the monohydrated hydrogen ion, $H_3O^+$, which is also sometimes called the oxonium ion or the hydronium ion. When M is hydrogen, the degree of solvation of the hydrogen ion is not critical and is of no particular importance to the present invention. The above usage of the term "hydrogen" is based in nomenclature approved by the International Union of Pure and Applied Chemistry; see J. Am. Chem. Soc., 82, 5529–30 (1960).

It is obvious that when M is H⁺ and the bis-Lewis base type co-reactant is a diamine, the first reaction occurring is salt formation. The salt can be heated directly in the reaction mixture to obtain the polymer, or optionally, can be isolated and heated.

*Process III.*—This process is used to prepare polymers of the invention when the A component is a bis(thio ether), i.e., where A is

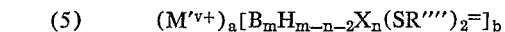

A polyboron compound of the formula (5) $\quad (M'^{v+})_a [B_m H_{m-n-2} X_n (SR'''')_2^=]_b$ where M′ is a metallic cation or an ammonium or substituted ammonium cation of valence $v$, $a$ and $b$ are the smallest positive whole numbers satisfying the equation $a=2b/v$, and the remaining symbols are defined as previously, is reacted with a compound of the formula X′—Q″—X′, where X′ is chlorine, bromine or iodine (preferably bromine) and Q″ is divalent hydrocarbyl or oxygen-interrupted hydrocarbyl free of acetylenic and allenic unsaturation bonded to the X′ groups through saturated carbon.

Preferred M′ groups are alkali metals and alkaline-earth metals, especially the former.

Although a solvent is not necessary, its use in the process is advantageous. Solvents which may be employed include amides of lower alkanoic acids especially di(lower alkyl) amides, nitriles, and tetramethylene sulfone. The temperature may range from 0–150° C. and preferably 20–80° C.

In Formula 5, R″″, X, $m$ and $n$ are as previously defined. Preferably Q″ is of 1–18 carbon atoms and may be alkylene (e.g., —(CH₂)₄—), arylenedialkylene (e.g., —CH₂C₆H₄CH₂—), or alkenylene (e.g.,

—CH₂CH=CHCH₂—)

of 4 to 12 carbon atoms. Examples include octamethylene, 1,5-naphthylenedimethylene, dodecamethylene, octadecamethylene, 1,1-cyclohexylidenedimethylene, 2-methyl-2-butenylene, and 1,4-dimethyl-2-butenylene.

*Process IV.*—The process may be used to prepare polymers in which the A component is a bisdisulfide. A polyboron compound of Formula 5 is reacted with a compound of the formula HS—Q'—SH and a compound capable of oxidizing a thiol to a disulfide, e.g., bromine or iodine. The operating conditions are the same as for Process III. Since Q' is defined the same as in Process II, examples and preferred groups of Q' in this process are the same as in Process II.

*Process V.*—In this process, used to prepare polymers in which the A component is a bis(thio ether), at least one compound of the formula (6)          $B_{10}H_{8-n}X_nZ'_2$ is reacted with a diisocyanato or dihalocarbonyl reactant in which the remaining portion of this latter reactant is preferably solely divalent aliphatically saturated hydrocarbyl. The Z' component is an aliphatically saturated hydrocarbyl sulfide substituted with a hydroxyl or amino group bearing at least one, and preferably two hydrogens. X and $n$ are as previously defined.

The use of a solvent is optional, and if one is used, such solvents as amides of lower alkanoic acids [especially di(lower alkyl)amides thereof] and tertiary amines (e.g., triethylamine, pyridine, methylpyridines and quinolines) are preferred.

The process is preferably carried out at ordinary room temperatures (20–30° C.) but temperatures of from 0–100° C. may be used.

As a result of the reaction between the compound of Formula 6 and the complementary diisocyanato or dihalocarbonyl reactant, a polymer is formed in which the A component has the structure

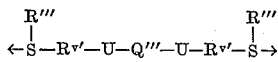

where R''' is as previously defined, R$^{v'}$ is lower alkylene or phenylene, Q''' is divalent aliphatically saturated hydrocarbyl, and U is

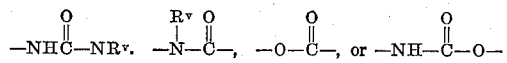

The component containing the Q''' group is provided by the diisocyanato (OCN—Q'''—NCO), or the dihalocarbonyl

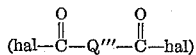

reactant. Examples of these reactants include: 1,5-naphthylene diisocyanate, 4,4' - diisocyanatobibenzyl, 3,3 - dimethyl - 4,4' - diisocyanato - diphenylmethane, ethylene diisocyanate, tetramethylene diisocyanate, decamethylene diisocyanate, 1,4 - cyclohexylene diisocyanate, and 1,4 - phenylene diisocyanate; malonyl chloride, sebacoyl bromide, 1,4 - cyclohexanediacetyl fluoride, 1,4 - naphthalenedicarbonyl chloride, adipoyl iodide, and 1,2 - cyclopentanedicarbonyl chloride.

Optionally, at least one (preferably one) polyboron compound of Formula 6 in which the substituent on each Z' group is halocarbonyl or isocyanato, can be reacted with at least one (preferably one) complementary reactant in which the two functional groups are of the class consisting of hydroxyl and amino in which the nitrogen bears at least one and preferably two hydrogens, i.e., primary amino and secondary amino. In addition, at least one (preferably one) polyboron compound of Formula 6 in which the substituent on each Z' group is carboxyl can be reacted with at least one (preferably one) complementary reactant containing two reactive functional groups, e.g., two epoxide groups.

Alternatively, a bifunctional polyboron compound of Formula 6 may be reacted with two moles of a complementary bifunctional reactant, e.g., a diisocyanate to give an intermediate compound containing the two unreacted functional groups (the —NCO groups here). Then this compound may be reacted with a bifunctional reactant complementary to it, i.e., complementary to the —NCO groups here to obtain the polymeric product. This alternative procedure is exemplified in Example 27 where the intermediate diisocyanate compound is reacted with a diamine to give a polymer in which the A component has the structure

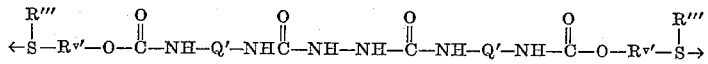

Here R''', R$^{v'}$ and Q' are as previously defined. The Q' component is provided by a diisocyanato reactant of the formula OCN—Q'—NCO which is exemplified as follows: 1,5 - naphthylene diisocyanate, 4,4' - diisocyanatobibenzyl, 3,3' - dimethyl - 4,4' - diisocyanatodiphenylmethane, ethylene diisocyanate, tetramethylene diisocyanate, decamethylene diisocyanate, 1,4 - cyclohexylene diisocyanate, and 1,4 - phenylene diisocyanate; 2,4' - diisocyanatodiphenyl ether and 5,5' - diisocyanatodiphenyl ether.

*Process VI.*—This process provides a method of halogenating polymers of Formula 1 wherein $n$ is less than $m$—2 and preferably is 0. Preferred A components of the starting polymer include bis(thio ether), bis-sulfone, or a dinitrile.

Halogenation takes place by treating the polyboron polymer with a halogen, preferably chlorine, bromine or iodine at temperature of from 0–175° C. although temperatures of 20–80° C. are usually employed.

The use of a solvent or diluent is advantageous, although not necessary. Advantageous solvents include halocarbons or halohydrocarbons, e.g., methylene chloride, carbon tetrachloride, ethylene bromide, chlorobenzene, bromobenzene, fluorobenzene, 1,1,2 - trichloro - 1,2,2 - trifluoroethane.

In the foregoing Processes II–VI, reactants containing no X substituents are more readily available and are, for that reason, preferred.

In all of the foregoing processes, equivalent quantities of reactants are usually employed. The processes may be carried out at subatmospheric or superatmospheric pressure, but usually atmospheric pressure is used for convenience. The course of the reactions can be followed by well-known infrared analysis, and when complete, the products may be isolated by well-known methods, e.g., evaporation of volatile material or drowning the reaction mixture in a nonsolvent such as water, lower alkanols, or hydrocarbons.

Since in any of the foregoing Processes I–V, more than one reactant of any given type can be used, the invention includes copolymers resulting from such pluralities of reactants.

The preferred polymers, particularly for use in preparing films and fibers, have molecular weights above 10,000. However, polymers of lower molecular weight, e.g., in the 3,000–10,000 range, can be used in coatings that resist the passage of neutrons and as components of solid high-energy fuels.

In general, the polymers of the invention are solids or viscous liquids, and are stable to air and water. Inert materials such as dyes, pigments, fillers, delusterants, plasticizers, and antioxidants can be incorporated in the polymers, either by being included in the polymerization mixtures or by being mixed with the preformed polymer by known techniques. Polymers containing such additives are included in the products of the invention.

*Preparation of boron starting materials*

The boron starting materials are all prepared from $B_{10}H_{10}^=$ and $B_{12}H_{12}^=$ compounds. These compounds are prepared as follows:

$B_{10}H_{10}^=$ *Compounds.*—Compounds containing the $B_{10}H_{10}^=$ anion are prepared by reacting an organic sulfide (e.g., a dialkyl sulfide) with decaborane(14) at a temperature between 0° and 150° C. until about 1 mole of hydrogen is evolved. The decaborane(12)/organic sulfide adduct formed is then reacted with liquid ammonia or an amine at a temperature of between —50° C. and 0° C. for about 1 hour to obtain $(NH_4)_2B_{10}H_{10}$ or $(amine \cdot H)_2B_{10}H_{10}$. By replacement of the cation, $H_2B_{10}H_{10}$ and many other salts of $B_{10}H_{10}^=$ may be obtained. The process is explained in greater detail in assignee's copending application Ser. No. 237,392, filed November 13, 1962 in the name of W. H. Knoth, Jr.

$B_{12}H_{12}^=$ *Compounds.*—The primary starting material for the preparation of the $B_{12}$ compounds is diborane, $B_2H_6$. Any alkali-metal salt of the acid $H_2B_{12}H_{12}$ can be prepared by the reaction of the appropriate alkali-metal hydroborate, e.g., $NaBH_4$, with diborane in the presence of an ether such as ethyl ether or 1,2-dimethoxyethane. The process is carried out in a closed system at a temperature of at least 100° C. and at autogenous pressure, which pressure should be at least three atmospheres. The product can be recrystallized from ethers such as ethyl ether or tetrahydrofuran or mixtures thereof. Any organic solvate of crystallization can be removed by mixing the product with water and distilling out the organic solvate. The product is then isolated by evaporation. The sodium salt is thus obtained as a hydrate, the exact degree of hydration depending on the extent of drying. Hydrates of the acid $H_2B_{12}H_{12}$ can be prepared by simply acidifying the sodium salt with a strong mineral acid such as HCl or by bringing a solution of the sodium salt into contact with an acidic cation-exchange resin. The acid hydrates are isolated by evaporation, the degree of hydration obtained again depending on the extent of evaporation. This process is detailed in assignee's copending application Ser. No. 246,636, filed Dec. 21, 1962 in the name of H. C. Miller and E. L. Muetterties.

*Compounds containing the $B_mH_{m-n}X'_n^=$ anion (the starting reactant of Process II)*

To prepare the anions in which X is halogen, $Na_2B_{10}H_{10}$ or $Na_2B_{12}H_{12}$ is halogenated with the desired halogen (chlorine, bromine, or iodine), or in the case of fluorine, with anhydrous HF.

The compounds wherein X is hydrocarbyl free of aliphatic unsaturation are prepared by reacting the $B_{10}H_{10}^=$ or $B_{12}H_{12}^=$ anion with an olefinic reactant at 50°–100° C. under autogenous pressure.

When $n$ in Formula 1 is more than 1, the X groups may be the same or different. To obtain compounds in which the X groups are different, the $B_{10}H_{10}^=$ or $B_{12}H_{12}^=$ anion is reacted with one electrophilic reagent until the desired number of substituents are introduced and the partially substituted product is then reacted with a second electrophilic reagent. The intermediate partially substituted product can, if desired, be isolated prior to reaction with the second electrophilic reagent. The process can be repeated with a third electrophilic reagent, or even further, until all hydrogens bonded to borons have been replaced.

The cation of the salts described above can be any cation. For example, it may be hydrogen, hydronium, a metal, ammonium, hydrazonium, N-substituted ammonium, N-substituted hydrazonium, aryldiazonium, sulfonium, phosphonium, metal ammine, and the like. The salts obtained in the foregoing processes can be replaced by other cations through the usual cation-exchange reactions.

All of the processes in this section are more fully described in assignee's aforementioned copending applications Ser. Nos. 237,392 and 246,636. Specific examples of the compounds include:

$H_2B_{10}H_9C_2H_5$, $H_2B_{10}H_8(C_6H_{11})_2$, $H_2B_{10}H_5Br_5$
$(NH_4)_2B_{10}H_4F_6$, $(NH_4)_2B_{10}H_5Cl_5$, $(C_{12}H_{25}NH_3)_2B_{10}H_7I_3$
$(C_5H_{10}NH_2)_2B_{10}H_4BrI_5$, ($C_5H_{10}NH_2$ is piperidinium)
$(C_5H_5NH)B_{10}H_5Cl_3F_2$, ($C_5H_5NH$ is pyridinium)
$[C_6H_5NH(CH_3)_2]_2B_{10}H_8(C_2H_4C_6H_5)_2$, $(NH_4)_2B_{12}H_2Cl_{10}$
$(C_6H_5NH_3)_2B_{12}H_{11}C_8H_{17}$, $[(C_6H_{11})_2NH_2]_2B_{12}H_4Br_8$
$[(C_2H_5)_3NH]_2B_{12}H_{11}I$, $H_2B_{12}H_4Cl_7CH(CH_3)_2$
$H_2B_{12}H_{10}C(CH_3)_3C_6H_{11}$, $(NH_4)_2B_{12}H_8F_3I$
$(C_3H_7NH_3)_2B_{12}H_5Cl_5(C_2H_4C_6H_5)_2$
$(tert-C_4H_9NH_3)_2B_{12}H_8Cl_4$
$[(C_5H_{11})_2NH_2]_2B_{12}H_{10}(C_2H_5)_2$
$[(CH_3)_3NH]_2B_{12}H_3Br_3Cl_6$, $[(C_2H_5)_3NH]_2B_{12}H_6F_6$

*$B_{10}$ bisdiazonium compounds (Process I)*

The $B_{10}$ bisdiazonium compounds are generally prepared by nitrosating the $B_{10}H_{10}^=$ or $B_{10}H_{10-n}X_n^=$ anions with nitrous acid and reacting the resulting product with a reducing agent such as the alkali metal tetrahydroborates, metal-acid combinations or catalytic reducing compounds. The X substituents may be substituted into the boron cage either before or after formation of the diazonium compounds. This procedure is described more fully in assignee's copending application Ser. No. 186,270, filed April 9, 1962 in the name of W. H. Knoth, Jr., now abandoned. Examples of $B_{10}$ bisdiazonium compounds include:

$B_{10}H_8(N_2)_2$, $B_{10}H_7I(N_2)_2$, $B_{10}H_5Cl_3(N_2)_2$, $B_{10}Cl_8(N_2)_2$
$B_{10}I_8(N_2)_2$, $B_{10}Br_8(N_2)_2$, $B_{10}H_6(C_2H_5)_2(N_2)_2$
$B_{10}Cl_7C_6H_{11}(N_2)_2$, $B_{10}H_7F(N_2)_2$, $B_{10}H_7C_5H_9(N_2)_2$
$B_{10}H_7Br(N_2)_2$, $B_{10}H_5Br_3(N_2)_2$, $B_{10}H_7C_6H_{13}(N_2)_2$

*$B_{10}$ and $B_{12}$ biscarboxamides (Process I)*

A $B_{10}H_{10}^=$ or $B_{12}H_{12}^=$ compound is reacted with an amide derived from a carboxylic acid in the presence of a strong organic or inorganic acid usually by bubbling HCl through the mixture. The reaction is exothermic and proceeds rapidly. After the exothermic phase is completed, heat is applied and passage of HCl through the mixture continued. The product is isolated by conventional methods. X substituents may be introduced by aforedescribed methods after isolation of the $B_{10}$ or $B_{12}$ biscarboxamide.

This procedure is more fully described in assignee's copending application Ser. No. 251,697, filed Jan. 15, 1963 in the name of W. H. Knoth, Jr., and Ser. No. 225,966, filed Sept. 21, 1962 in the name of W. H. Knoth, Jr. Examples of the above compounds include:

$B_{10}H_8(N\text{-methylpyrrolidone})_2$
$B_{10}H_6(C_4H_9)_2[CH_3CON(C_2H_5)_2]_2$
$B_{10}Cl_7C_{12}H_{25}(N\text{-methylpyrrolidone})_2$
$B_{10}H_8[HCON(C_6H_{13})_2]_2$, $B_{10}H_8[C_3H_7CON(CH_3)_2]_2$
$B_{10}H_5Cl_3[HCON(CH_3)_2]_2$, $B_{10}H_7F[CH_3CON(C_2H_5)_2]_2$
$B_{12}H_{10}[HCON(CH_3)_2]_2$, $B_{12}H_{10}[CH_3CON(C_4H_9)_2]_2$
$B_{12}H_{10}[HCON(C_2H_5)_2]_2$, $B_{12}H_{10}[HCON(C_6H_{11})_2]_2$

*$B_{10}bis(thio\ ethers)$ (Processes III and IV)*

$H_2O_2$ is dropped into a mixture of a hydrocarbyl sulfide in glacial acetic acid at 50° C. The mixture is allowed to stand for 1 to 2 hours and then a $B_{10}H_{10}^=$ compound is added and HCl bubbled into the mixture at about 60° C. and $B_{10}H_8 \cdot 2$ (hydrocarbyl sulfide) obtained. X substituents may be placed in the $B_{10}$ cage structure by previously described methods after isolation of the $B_{10}$ bis(thio ether).

$B_mH_{m-n-2}X_n(SR'''')_2^=$ anions (Processes III and IV)

When $m$ is 10.

The $B_{10}$ bis(thio ether) obtained immediately above is treated with a thiol such as thiophenol in the presence of an equivalent amount of KOH in ethanol at reflux for several hours to obtained the desired product.

This procedure is outlined in further detail in assignee's copending application Ser. No. 237,392, filed Nov. 13, 1962, in the name of W. H. Knoth, Jr. Specific examples include: $Cs_2B_{10}H_8(SC_6H_5)_2$, $Cs_2B_{10}H_8(p-SC_6H_4Cl)_2$,
$H_2B_{10}H_8(m-SC_6H_4NH_2)_2$, $MgB_{10}Br_8(SC_2H_5)_2$
$BaB_{10}Cl_8(SC_5H_9)_2$, $Na_2B_{12}H_9C_6H_{11}(SCH_3)_2$
$CaB_{12}F_{10}(SCH_2C_6H_5)_2$, $K_2B_{12}H_4Cl_6(SC_{12}H_{25})_2$
$Cs_2B_{12}H_{10}(SCH_3)_2$, $BaB_{12}H_{10}(SCH_2C_6H_5)_2$
$MgB_{12}H_6F_4(SCH_3)_2$, $Rb_2B_{12}H_9C_6H_{11}(SCH_3)_2$.

When $m$ is 12.

Hydrated $H_2B_{12}H_{12}$ is stirred for 18 hours at room temperatures with a hydrocarbyl disulfide (RSSR) whereupon two fractions are isolated, one containing $B_{12}H_{11}SR^=$ and the other $B_{12}H_{10}(SR)_2^=$. The procedure is detailed in assignee's copending application Ser. No. 246,636. X substituents may be placed on the $B_{12}$ cage as previously shown.

*Compounds of the Formula $B_{10}H_{8-n}X_nZ''_2$*
*(reactants of Process V)*

These reactants are thio ethers containing a hydroxyl group, or a primary or secondary amino group. They may be prepared by the reaction described in the section immediately above.

Specific examples of the above reactants include:

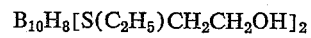
$B_{10}H_8[S(C_2H_5)CH_2CH_2OH]_2$

$B_{10}H_8[m\text{-}S(CH_3)C_6H_4NH_2]_2$

$B_{10}H_8[S(C_2H_5)CH_2CH_2NHCH_3]_2$

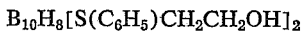
$B_{10}H_8[S(C_6H_5)CH_2CH_2OH]_2$

$B_{10}H_8S(C_2H_5)CH_2CH_2COOH]_2$

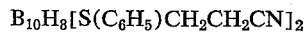
$B_{10}H_8[S(C_6H_5)CH_2CH_2CN]_2$

The preparation of the boron-cage reactant used in the second variation of Process V is found in Example 27.

The infrared absorption spectrum of the polymer showed absorption at 4μ (B-H) and 6.25μ (amide C=O), and no absorption at 4.6μ.

In a similar manner $B_{10}H_5F_3(N_2)_2$ may be reacted with

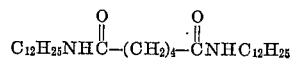

to obtain

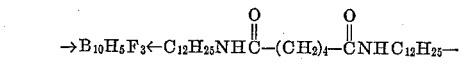

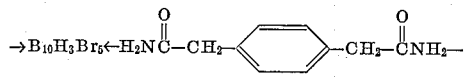
$B_{10}H_3Br_5(N_2)_2$ with $H_2NC\text{—}CH_2\text{—}\bigcirc\text{—}CH_2\text{—}CNH_2$ to prepare

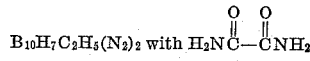

and

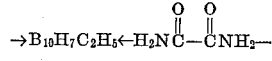
$B_{10}H_7C_2H_5(N_2)_2$ with $H_2NC\text{—}CNH_2$ to obtain

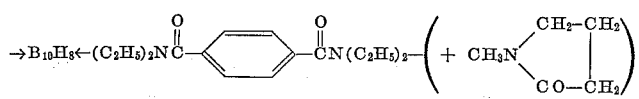

EXAMPLE 2

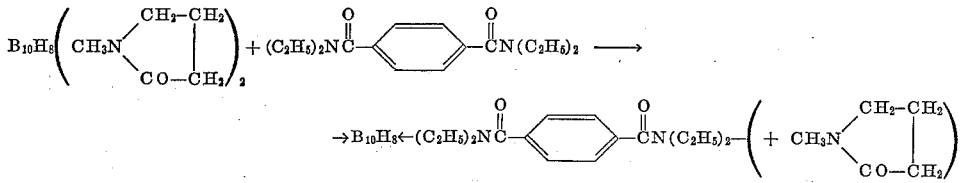

The polymeric products of the invention and their methods of preparation are illustrated further in the examples which follow. The equations used are partly schematic, in that they show only formation of the repeating unit of Formula 1. It is understood that the actual product of each example is in fact a polymer containing the repeating unit shown.

EXAMPLE 1

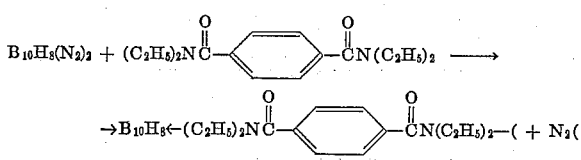

In an atmosphere of nitrogen, a tubular glass reactor was charged with 0.3000 g. of $B_{10}H_8(N_2)_2$ and 0.4808 g. of N,N,N',N'-tetraethylterephthalamide, and the two reactants were mixed intimately. The open end of the reactor was closed with a rubber cap fitted with a narrow-bore gas-inlet tube (the lower end of which was free of the reaction mixture) and a similar gas-exit tube. A slow stream of nitrogen was passed through the reactor from the gas-inlet tube throughout the process. Thus, volatile material could be released slowly from the reactor through the gas-exit tube, but only nitrogen could enter the reactor. The reactor was heated at 95–115° C. for 3.7 hours. The solid mixture began to fuse at about 100° C., and nitrogen was eliminated. The mixture was cooled, and a small sample of the solid was removed for infrared analysis. The sample had absorption at 4.6μ, characteristic of the diazonium group of $B_{10}H_8(N_2)_2$, the presence of which showed that reaction was not complete. The mixture was heated at 150–160° C. for 3.5 hours and cooled. The solid product obtained from the reactor was a polymer having the repeating unit shown in the above equation.

*Analysis.*—Calcd. for $C_{16}H_{32}B_{10}N_2O_2$: N, 7.1. Found: N, 7.3.

An intimate mixture of 0.9643 g. of $B_{10}H_8(1\text{-methyl-}2\text{-pyrrolidone})_2$ and 0.8476 g. of N,N,N',N'-tetraethylterephthalamide was heated at 200° C. for 60 hours in a reactor like that of Example 1, following which the gas-inlet and gas-exit tubes were removed and the mixture was heated at 137° C./0.1 mm. for four hours. The solid product was cooled, washed thoroughly with water, and dried at 100°/0.1 mm. over $P_2O_5$. It was a polymer containing the repeating unit shown in the above equation.

*Analysis.*—Calcd. for $C_{16}H_{32}B_{10}N_2O_2$: C, 49.0; H, 8.2; N, 7.1. Found: C, 50.4; H, 8.1; N, 7.52.

The inherent viscosity of the polymer was 0.06 (0.25% solution in dimethylformamide at 25° C.). The infrared absorption spectrum of the polymer (mineral-oil mull) had strong absorption at 4.0μ (B-H) and at 6.1μ (amide C=O).

$B_{12}H_{10}[HCON(CH_3)_2]_2$ can be reacted with

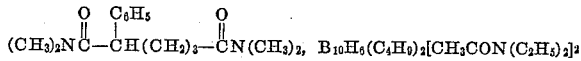

with $C_6H_{13}NHC\text{—}CH_2\text{—}CNHC_6H_{13}$ and $B_{10}Cl_7C_{12}H_{25}[1\text{-methyl-}2\text{-pyrrolidone}]_2$ with $(C_3H_7)_2NC\text{—}\bigcirc\text{—}CN(C_3H_7)$

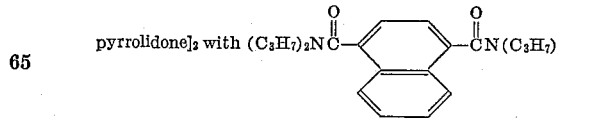

by the above process, and the expected polymers obtained.

Examples 3–11 are summarized in the following Table I. The procedure used in their preparation was that of Example 1 differing only in the indicated temperature at which the reaction was carried out. In addition, the products of Examples 3, 4 and 10 were isolated as in Example 2; the others, as in Example 1.

TABLE I

| Example No. | Reactants (Gms.) | Temp., °C. | Pressure | Time, Hr.:Min. | Recurring Unit in Polymer | Properties of Polymer and Remarks |
|---|---|---|---|---|---|---|
| 3 | $B_{10}H_8(N_2)_2$ (0.5319)<br>$HCON(C_2H_5)(CH_2)_4N(C_2H_5)CHO$ (0.6759) | 90–108<br>140–150 | Atm.<br>Atm. | 60:40<br>4:00 | →$B_{10}H_8$←—HCN—$(CH_2)_4$—NCH—<br>‖      ‖<br>O      O<br>$C_2H_5$     $C_2H_5$ | IR (infrared) absorption at 4.05 μ (B—H) and 6.1 μ (amide C=O).<br>Anal.: Calcd. for $C_{10}H_{28}B_{10}N_2O$: N, 8.9. Found: N, 9.0. |
| 4 | $B_{10}H_8$(N-methylpyrrolidone)$_2$ (1.7493)<br>$HCON(C_2H_5)(CH_2)_4N(C_2H_5)CHO$ (1.1142) | 200 | Atm. | 60:00 | →$B_{10}H_8$←—HCN—$(CH_2)_4$—NCH—<br>‖      ‖<br>O      O<br>$C_2H_5$     $C_2H_5$ | IR absorption at 4.05 μ (B—H) and 6.1 μ (amide C=O).<br>Anal.: Calcd. for $C_{10}H_{28}B_{10}N_2O$: C, 38.0; H, 8.9; N, 8.9. Found: C, 40.2; H, 8.9; N, 8.3.<br>Inh. visc. 0.1. |
| 5 | $B_{10}Cl_8(N_2)_2$ (0.4849)<br>$HCON(C_2H_5)(CH_2)_4N(C_2H_5)CHO$ (0.2164) | 25<br>100–120 | Atm.<br>Atm. | 2 days<br>0:20 | →$B_{10}Cl_8$←—HCN—$(CH_2)_4$—NCH—<br>‖      ‖<br>O      O<br>$(CH_3)_2$    $C_2H_5$<br>         $(CH_3)_2$ | $N_2$ began to evolve immediately at 25° C.<br>Anal.: Calcd. for $C_{10}H_{20}B_{10}Cl_8N_2O$: C, 20.3; H, 3.4; N, 4.7. Found: C, 21.0; H, 3.9; N, 4.60. |
| 6 | $B_{10}H_8(N_2)_2$ (0.8610)<br>m-$(CH_3)_2NSO_2C_6H_4$—$SO_2N(CH_3)_2$ (1.3000) | 90, 120<br>130–150 | Atm.<br>Atm. | 5:00<br>30:00 | →$B_{10}H_8$←—NSO$_2$—⟨phenyl⟩ | IR indicated incomplete reaction after 5 hrs. IR of product had absorption at 6.4 μ, 7.3–7.8 μ, 10.5 μ, 12.6 μ, 14.1 μ, and 14.8 μ.<br>Anal.: Calcd. for $C_{10}H_{14}B_{10}N_2O_4S_2$: C, 29.4; H, 5.9; S, 15.7. Found: C, 27.0; H, 5.6; S, 14.0.<br>Inh. visc. 0.15 (0.25% solution in dimethyl sulfoxide).<br>Liquid layers of a 5% solution of the polymer in dimethyl sulfoxide were applied to glass and steel surfaces, and the solvent was allowed to evaporate at room temperature. Clear, hard, well-adhering protective coatings on both substrates were thus obtained. |
| 7 | $B_{10}H_8(N_2)_2$ (1.1303)<br>$CH_3S(CH_2)_4SCH_3$ (0.9846) | 85<br>105<br>130–140 | Atm.<br>Atm.<br>Atm. | 24:00<br><br>3:00 |      $CH_3$     $CH_3$<br>→$B_{10}H_8$←—S—$(CH_2)_4$—S— | IR indicated complete consumption of $B_{10}H_8(N_2)_2$.<br>Anal.: Calcd. for $C_6H_{22}B_{10}S_2$: C, 27.0; H, 8.3; S, 23.9. Found: C, 23.1; H, 7.9; S, 22.8. |
| 8 | $B_{10}H_8(N_2)_2$ (0.8610)<br>$CH_3SO_2(CH_2)_6SO_2CH_3$ (1.2100) | 90–120<br>120<br>150 | Atm.<br>Atm.<br>Atm. | 3<br>3<br>2 |      $CH_3$     $CH_3$<br>→$B_{10}H_8$←—SO$_2$—$(CH_2)_6$—SO$_2$— | 0.1 g. tetramethylene sulfone added to lower M.P. of mixture.<br>IR absorption at 4.0 μ (B—H) and at 7.7 μ and 8.7 μ (sulfone S→O).<br>Anal.: Calcd. for $C_8H_{26}B_{10}O_4S_2$: C, 26.8; H, 7.3. Found: C, 26.40; H, 6.9. |
| 9 | $B_{10}H_8(N_2)_2$ (0.8345)<br>$NC(CH_2)_4CN$ (0.5234) | 100–140<br>140 | Atm.<br>Atm. | 2<br>16 | →$B_{10}H_8$←—NC—$(CH_2)_4$—CN— | IR absorption at 4.0 μ (B—H) and 4.35 μ (C≡N).<br>Anal.: Calcd. for $C_6H_{18}B_{10}N_2$: C, 32.1; H, 7.2; N, 12.5. Found: C, 31.5; H, 7.2; N, 12.6. |
| 10 | $B_{10}H_8(N_2)_2$ (0.7868)<br>$H_2N(CH_2)_6NH_2$ (0.5300) | 25–90<br>90→120 | Atm.<br>Atm. | 1<br>2 | →$B_{10}H_8$←—H$_2$N—$(CH_2)_6$—NH$_2$— | $N_2$ evolution began at about 90° C.<br>Anal.: Calcd. for $C_6H_{24}B_{10}N_2$: C, 30.9; H, 10.3; N, 12.1. Found: C, 28.9; H, 10.1; N, 11.6.<br>IR absorption at 2.8 μ and 3.1 μ (N—H) and 4.0 μ (B—H). |
|  |  | 140 | Atm. | 16 |  |  |
| 11 | $B_{10}H_8(N_2)_2$ (0.7932)<br>$(CH_3)_2N(CH_2)_6N(CH_3)_2$ (0.7923) | 100<br>140 | Atm.<br>Atm. | 16<br>5 |      $CH_3$     $CH_3$<br>→$B_{10}H_8$←—N—$(CH_2)_6$—N—<br>     $CH_3$     $CH_3$ | $N_2$ evolution began at 100° C. Infrared absorption at 4.0 μ (B—H) and 6.2 μ.<br>Anal.: Calcd. for $C_{10}H_{32}B_{10}N_2$: C, 41.6; H, 11.1; N, 9.7. Found: C, 38.7; H, 10.2; N, 9.7.<br>Inh. visc. 0.08 (0.25 S solution in dimethyl sulfoxide). |

In addition to the foregoing Examples 3–11, the following Table II lists additional reactions which may be used in place of the reactants listed for Examples 3–11.

(mineral-oil mull) had strong absorption at 4.05μ (B–H). The inherent viscosity of the polymer was 0.05 (0.25% solution in dimethylformamide at 25° C.).

TABLE II

| Example | Reactants |
|---|---|
| 3 | $B_{10}H_7I(N_2)_2 + m\text{-}CH_3CONH\text{-}C_6H_4\text{-}NHCOCH_3$ |
| | $B_{10}H_8(N_2) + C_6H_5CN\begin{array}{c}CH_2\text{-}CH_2\text{-}CH_2\\ \phantom{xxx}\\ CH_2\text{-}CH_2\end{array}NCOC_6H_5$ |
| 4 | $B_{12}H_{10}[CH_3CON(C_4H_9)_2]_2 + p\text{-}CH_3C_6H_4CON(CH_3)\text{-}(CH_2)_{10}\text{-}N(CH_3)COC_6H_4CH_3(p\text{-})$ |
| 5 | $B_{10}I_8(N_2)_2 + (C_4H_9)_2NCO\text{-}CH_2CH_2\text{-}O\text{-}CH_2CH_2\text{-}CON(C_4H_9)_2$ |
| | $B_{10}Br_8(N_2)_2 + HCON(CH_2C_6H_5)\text{-}(CH_2)_6\text{-}N(CH_2C_6H_5)CH$ |
| | $B_{10}Cl_7C_6H_{11}(N_2)_2 + (CH_3)_3CCONH\text{-}CH_2CH_2\text{-}NHCOC(CH_3)_3$ |
| | $B_{10}Cl_8(N_2)_2 + NC\text{-}CH_2CH_2\text{-}CN$ |
| | $B_{10}Br_8(N_2)_2 + (CH_3)_2NSO_2\text{-}(CH_2)_4\text{-}SO_2N(CH_3)_2$ |
| | $B_{10}I_8N_2 + C_6H_{11}S\text{-}(CH_2)_6\text{-}SC_6H_{11}$ |
| | $B_{10}Cl_8(N_2)_2 + C_6H_5CH_2SO_2\text{-}(CH_2)_4\text{-}SO_2CH_2C_6H_5$ |
| | $B_{10}Cl_8(N_2)_2 + m\text{-}H_2N\text{-}C_6H_4\text{-}NH_2$ |
| | $B_{10}Cl_8(N_2)_2 + CH_3SO_2NH\text{-}(CH_2)_6\text{-}NHSO_2CH$ |
| 6 | $B_{12}H_{10}[HCON(C_2H_5)_2]_2 + C_6H_5NHSO_2\text{-}CH_2CH_2\text{-}SO_2NHC_6H_5$ |
| | $B_{10}H_6I_2(N_2)_2 + H_2NSO_2\text{-}(CH_2)_4\text{-}SO_2NH_2$ |
| | $B_{10}H_6BrC_5H_{11}(N_2)_2 + p\text{-}CH_3C_6H_4SO_2N(C_2H_5)\text{-}(CH_2)_8\text{-}N(C_2H_5)SO_2C_6H_4CH_3(p\text{-})$ |
| | $B_{10}H_6(C_3H_7)_2(N_2)_2 + (C_2H_5)_2NSO_2\text{-}(CH_2)_{10}\text{-}SO_2N(C_2H_5)_2$ |
| 7 | $B_{10}H_5Br_2C_{10}H_{19}(N_2)_2 + C_2H_5S\text{-}CH_2\text{-}SC_2H_5$ |
| | $B_{10}H_7F(N_2)_2 + CH_3S\text{-}(CH_2)_{10}\text{-}SCH_3$ |
| | $B_{10}H_8(N_2)_2 + o\text{-}C_3H_7S\text{-}C_6H_4\text{-}SC_3H_7$ |
| 8 | $B_{10}H_7C_5H_9(N_2)_2 + C_{12}H_{25}SO_2\text{-}CH_2CH_2\text{-}SC_2C_{12}H_2$ |
| | $B_{10}H_5Cl_3(N_2)_2 + C_4H_9SO_2\text{-}CH_2\text{-}SO_2C_4H_9$ |
| | $B_{10}H_7Br(N_2)_2 + m\text{-}C_4H_9C_6H_4SO_2\text{-}CH_2\text{-}C_6H_4\text{-}CH_2\text{-}SO_2C_6H_4C_4H_9(m\text{-})$ |
| 9 | $B_{10}H_5Br_3(N_2)_2 + p\text{-}NC\text{-}CH_2CH_2C_6H_4CH_2CH_2\text{-}CN$ |
| | $B_{10}H_8(N_2)_2 + 1,5\text{-}NC\text{-}C_{10}H_6\text{-}CN$ |
| | $B_{10}H_7C_6H_{13}(N_2)_2 + NC\text{-}CH(CH_3)\text{-}CN$ |
| 10 and 11 | $B_{10}H_6(C_2H_5)_2(N_2)_2 + C_2H_5NH\text{-}(CH_2)_{12}\text{-}NHC_2H_5$ |
| | $B_{10}H_7I(N_2)_2 + H_2N\text{-}CH\begin{array}{c}CH_2\text{-}CH_2\\ \phantom{xxx}\\ CH_2\text{-}CH_2\end{array}CH\text{-}NH_2$ |
| | $B_{10}H_7Br(N_2)_2 + C_6H_5NH\text{-}(CH_2)_3\text{-}NHC_6H_5$ |

EXAMPLE 12

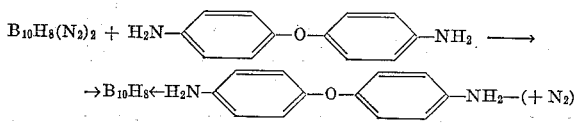

A mixture of 0.4188 g. of $B_{10}H_8(N_2)_2$, 0.4864 g. of di(4-aminophenyl) ether, and 70 ml. of p-xylene was refluxed (reaction temperature about 140° C.) for four hours and cooled. The insoluble solid was separated by filtration, washed with benzene, and dried at 100°/0.1 mm., to give a polymer having the repeating unit shown in the above reaction.

*Analysis.*—Calcd. for $C_{12}H_{20}B_{10}N_2O$: N, 8.8. Found: N, 8.7; 9.0.

The infrared absorption spectrum of the polymer

EXAMPLE 13

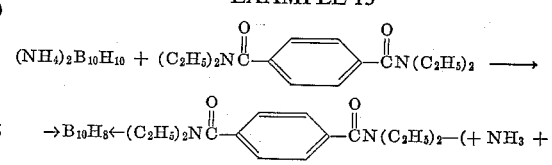

An intimate mixture of 1.5401 g. of $(NH_4)_2B_{10}H_{10}$ and 2.7601 g. of N,N,N',N'-tetraethylterephthalamide was heated at 140° C. for one hour in a reactor like that of Example 1. The mixture evolved a gas which was found to contain ammonia. After one hour at 140° C. and atmospheric pressure, the gas-inlet tube and gas-exit tube were removed, and the mixture was heated at 150–160° C./0.1 mm. for two hours, cooled to room temperature, and drowned in water. The insoluble solid was separated by filtration, washed, and dried at 100°/0.1 mm., to give a polymer having the repeating unit shown in the above equation.

*Analysis.*—Calcd. for $C_{16}H_{32}B_{10}N_2O_2$: C, 49.0; H, 8.2; N, 7.1. Found: C, 47.2; H, 8.4; N, 8.51.

The infrared absorption spectrum of the polymer (mineral-oil mull) had absorption at $4.0\mu$ (B–H) and $6\mu$ (amide C=O). The inherent viscosity of the polymer was 0.08 (0.25% solution in dimethylformamide at 25° C.).

Another polymer containing the repeating unit shown above was made by allowing a solution of 2.662 g. of $[(CH_3)_4N]_2B_{10}H_{10}$ and 2.760 g. of N,N,N′,N′-tetraethyl-terephthalamide in 15 ml. of glacial acetic acid plus 13 g. of concentrated sulfuric acid (which converted the $[(CH_3)_4N]_2B_{10}H_{10}$ to $H_2B_{10}H_{10}$) to stand at about 25° C. for 10 days and precipitating the product in excess water. The polymer thus obtained, after washing and drying, had an inherent viscosity of 0.14 (0.25% solution in dimethylformamide at 25° C.).

By using the above process, polymers may be obtained from $(NH_4)_2B_{10}H_2Cl_8 + NC—(CH_2)_8—CN$, $(C_6H_5NH_3)_2B_{12}H_{11}C_8H_{17} +$
$\qquad C_5H_{11}SO_2—(CH_2)_8—SO_2C_5H_{11}$ $[(C_6H_{11})_2NH_2]_2B_{12}H_4Br_8 +$
$\qquad (C_2H_5)_2NSO_2—(CH_2)_3—SO_2N(C_2H_5)_2$

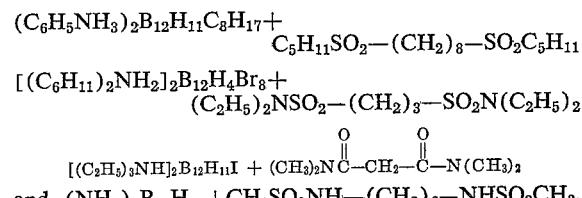

and $(NH_4)_2B_{10}H_{10} + CH_3SO_2NH—(CH_2)_6—NHSO_2CH_3$.

EXAMPLE 14

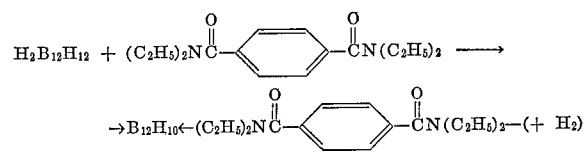

Concentrated aqueous $H_2B_{12}H_{12}$, made by mixing 2.0370 g. of $Cs_2B_{12}H_{12}$ and 1.0 g. of concentrated hydrochloric acid, was mixed with 2.7600 g. of N,N,N′,N′-tetraethylterephthalamide, and the system was evacuated to 0.1 mm. pressure at room temperature for five hours to remove as much of the water as possible. The temperature was then raised rapidly at atmospheric pressure to 180° C. and held there for one hour, and the mixture was cooled to room temperature. More $Cs_2B_{12}H_{12}$ (2.0370 g.) and concentrated hydrochloric acid (1.0 g.) were added, and the entire process was repeated, except that the temperature was maintained at 180° C. for three hours instead of one hour. At 180° C., the product was a viscous liquid, which solidified to a hard, horny solid on cooling. The product was a polymer having the repeating unit shown in the above equation. Its inherent viscosity was 0.05 (0.2% solution in dimethylformamide at 25° C.).

EXAMPLE 15

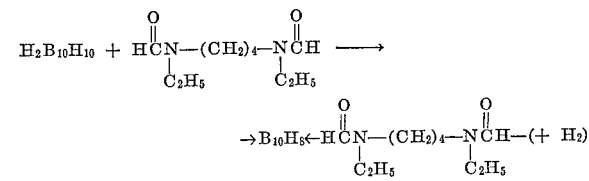

Concentrated aqueous $H_2B_{10}H_{10}$, made by acidifying 1.54 g. of $(NH_4)_2B_{10}H_{10}$ with 2 g. of concentrated hydrochloric acid, was mixed in a glass reactor with 8 g. of N,N′-diethyl-N,N′-diformyltetramethylenediamine, and the mixture was heated at 180° C. for 15 hours in an atmosphere of nitrogen and cooled. Additional $(NH_4)_2B_{10}H_{10}$ (4.62 g.) and concentrated hydrochloric acid (6 g.) were added, and the mixture was heated at 180° C. for another 15 hours. It was then cooled and drowned in water. The viscous oil that precipitated was separated and dried at 100° C./0.1 mm. over $P_2O_5$ to give a solid polymer having the repeating unit shown in the above equation.

The infrared absorption spectrum of the polymer (mineral-oil mull) had absorption at $4.03\mu$ (B–H) and $6.0\mu$ (amide C=O). The inherent viscosity of the polymer was 0.17 (0.25% solution in dimethylformamide at 25° C.).

EXAMPLE 16

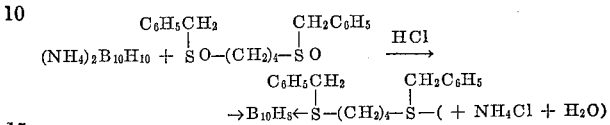

1,4-di(benzylthio)butane was prepared by reacting equivalent quantities of α-toluenethiol, potassium hydroxide, and 1,4-dibromobutane in ethyl alcohol at about 40° C., separating by filtration the potassium bromide that precipitated, and separating and distilling the heaver liquid layer of the filtrate, B.P. 212° C./1 mm.; M.P. 21° C.

*Analysis.*—Calcd. for $C_{18}H_{22}S_2$: C, 71.5; H, 7.3. Found: C, 72.3; H, 7.44.

A solution of 7.85 g. of 1,4-di(benzylthio)butane in 20 ml. of acetic acid was cooled in ice, and 5.9 g. of 20% hydrogen peroxide was added dropwise with stirring. The resulting solution of the bis-sulfoxide, 1,4-di(benzylsulfinyl)butane, was warmed to room temperature, 4.0 g. of $(NH_4)_2B_{10}H_{10}$ was added, and dry hydrogen chloride was bubbled through the mixture for a total time of about one hour. The temperature rose rapidly to about 60° C. because of the exothermic reaction and then gradually decreased. Within about 15 minutes a voluminous solid had precipitated. It was separated mechanically, washed with water by grinding in a mortar, seperated by filtration, washed successively with water, ethyl alcohol, and ethyl ether, and air-dried. The dry solid was dissolved in chloroform, and the chloroform solution was washed with aqueous potassium carbonate and with water and dried over anhydrous calcium chloride. The chloroform was evaporated under reduced pressure to give a solid polymer having the repeating unit shown in the above equation.

*Analysis.*—Calcd. for $C_{18}H_{30}B_{10}S_2$: C, 51.6; H, 7.10; B, 25.8. Found: C, 52.94; H, 7.15; B, 18.6.

In place of the reactants of Example 16,

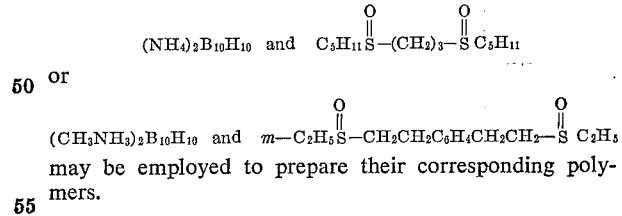

or

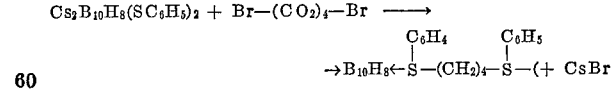

may be employed to prepare their corresponding polymers.

EXAMPLE 17

$Cs_2B_{10}H_8(SC_6H_5)_2 + Br—(CO_2)_4—Br \longrightarrow$ $\qquad \begin{array}{cc} C_6H_5 & C_6H_5 \\ | & | \end{array}$
$\rightarrow B_{10}H_8 \leftarrow S—(CH_2)_4—S—(+ CsBr$ To a vigorously stirred solution of 6.00 g. of $Cs_2B_{10}H_8(SC_6H_5)_2$ in about 30 ml. of dimethylacetamide was added 2.16 g. of 1,4-dibromobutane over a period of about five minutes at 25–27° C. The viscosity of the solution increased (a behavior typical of polymer formation), and cesium bromide precipitated as a white solid. Stirring was continued for one hour, after which the mixture was filtered to remove cesium bromide and the filtrate was poured into an equal volume of water. A cloudy liquid formed, and a solid product was precipitated from it by dissolving potassium chloride in the liquid. The product was separated by filtration, washed with water, and dried at 30° C. under reduced pressure, to give a polymer having the repeating unit of the above equation. The polymer softened at about 180° C. and melted to a clear liquid without decomposition at about 220° C.

Another polymer containing the same repeating unit, prepared by essentially the above method, except that the reaction mixture was heated at 65–80° C. for six hours, had an inherent viscosity of 0.1 (0.25% in dimethylacetamide at 25° C.) and contained 2.76% Br. By use of a relationship between log DP (DP is a degree of polymerization, or number of repeating units) and inherent viscosity for a poly(phenylene sulfide) reported in ASTIA, ASD–TDR–62–322, Part II, December 1962, a molecular weight of about 5900 was calculated for the polymer. This was in close agreement with a molecular weight of 5797 calculated from the combined bromine content, the assumption being made that this bromine was present entirely in end groups of the polymer.

Still another polymer containing the same repeating unit, and prepared by essentially the above method, except that the heating time was 14 hours, had a molecular weight by light scattering of 39,000.

EXAMPLE 18

$Cs_2B_{10}H_8(SC_6H_5)_2 + Br-(CH_2)_{10}-Br \longrightarrow$

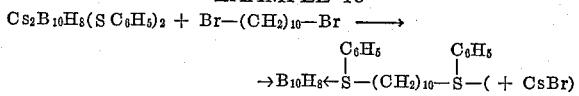

Essentially the procedure of Example 17 was repeated, except that a solution of 3.00 g. of 1,10-dibromodecane in 30 ml. of dimethylacetamide was used in place of the 1,4-dibromobutane. The filtrate obtained after removal of the cesium bromide was a dimethylacetamide solution of a polymer having the repeating unit shown in the above equation. The inherent viscosity of the polymer in this solution was 0.1. The solid polymer was isolated by the method of Example 17. The polymer melted at 100–110° C.

Analysis.—Calcd. for $C_{22}H_{38}B_{10}S_2$: S, 13.0. Found: S, 12.64.

A part of the solution of the polymer in dimethylacetamide, described above, was flowed out on a glass plate, and the solvent was evaporated at 100° C. There was thus obtained a clear, tough, protective coating that adhered well to the glass.

EXAMPLE 19

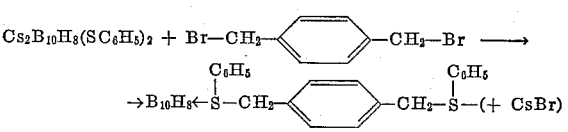

Essentially the procedure of Example 17 was repeated, except that a solution of 2.6395 g. of p-xylylene bromide in 20 ml. of dimethylacetamide was used in place of the 1,4-dibromobutane. The filtrate obtained after separation of cesium bromide was a dimethylacetamide solution of a polymer having the repeating unit shown in the above equation. The inherent viscosity of the polymer in this solution was 0.17. The solid polymer was isolated by pouring the dimethylacetamide solution into excess methanol, separating by filtration the solid that resulted, washing with ethyl ether and petroleum ether, and drying under reduced pressure over $P_2O_5$. The polymer did not melt or decompose at 300° C.

Analysis.—Calcd. for $C_{26}H_{26}B_{10}S_2$: C, 54.77; H, 5.93; B, 24.65; S, 14.65. Found: C, 53.11; H, 6.43; B, 23.28; S, 13.56.

A part of the solution of the polymer in dimethylacetamide, described above, was flowed out on a glass plate, and the solvent was evaporated at 100° C. There was thus obtained a clear, hard, protective coating.

EXAMPLE 20

$Cs_2B_{10}H_8(SC_6H_5)_2 + ClCH_2CH=CHCH_2Cl \longrightarrow$

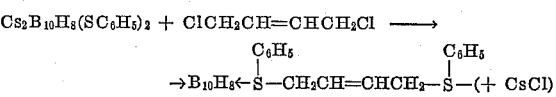

To a solution of 120.0783 g. of $Cs_2B_{10}H_8(SC_6H_5)_2$ in 500 ml. of dimethylacetamide was added 24.9996 g. of 1,4-dichlorobutane. The mixture was heated at 80° C. for 9 hours, cooled, and filtered to remove cesium chloride that had precipitated. The filtrate was diluted with methanol, and the polymer that precipitated was separated by filtration, washed thoroughly with water and dried. The product was a polymer having the repeating unit on the right side of the above equation.

Analysis.—Calcd. for $C_{16}H_{24}B_{10}S_2$: C, 49.44; H, 6.22; B, 27.84; S, 16.49. Found: C, 48.16; H, 6.45; B, 25.18; S, 15.22.

The inherent viscosity of the polymer was 0.08 (0.25% solution in dimethylacetamide).

EXAMPLE 21

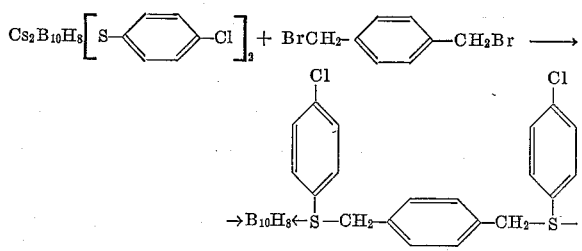

Solutions of 3.000 g. of $Cs_2B_{10}H_8(p\text{-}SC_6H_4Cl)_2$ in 20 ml. of dimethylformamide and 1.183 g. of p-xylylene bromide in 10 ml. of dimethylformamide were mixed, heated together at 70° C. for 30 minutes, and cooled. The cesium bromide that had precipitated was separated by filtration, and the polymeric product was isolated by drowning the filtrate in excess ethyl alcohol, filtering, and washing, and drying the solid thus obtained. The product was a polymer having the repeating unit shown in the above equation.

EXAMPLE 22

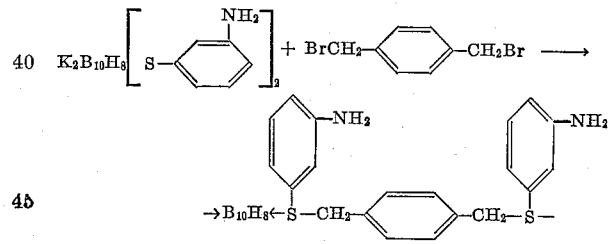

To a solution of 3.000 g. of $H_2B_{10}H_8(m\text{-}SC_6H_4NH_3Cl)_2$ in 20 ml. of dimethylformamide was added 1.53 g. of potassium hydroxide, which was the calculated amount to convert the polyboron compound to $$K_2B_{10}H_8(m\text{-}SC_6H_4NH_2)_2$$

A solution of 1.802 g. of p-xylylene bromide in 10 ml. of dimethylformamide was added and the mixture was heated with stirring at 70–80° C. for 30 minutes. It was cooled, and the solid potassium halides that had formed were separated by filtration. The product was isolated as in Example 21, except that water was used as the precipitation medium instead of ethyl alcohol. The product was a polymer containing the repeating unit shown in the above equation.

Analysis.—Calcd. for $C_{20}H_{28}B_{10}N_2S_2$: C, 51.70; H, 5.17; N, 6.03. Found: C, 50.83; H, 6.67; N, 6.64.

By routine variation of the operating procedures of Examples 17–22, the following boron reactants may be reacted with the following dihalides:

| Boron Reactant | Dihalide Reactant |
|---|---|
| $Na_2B_{12}H_9C_6H_{11}(SCH_3)_2$ | $CH_2Cl_2$ |
| $CaB_{12}F_{10}(SCH_2C_6H_5)_2$ | $ICH_2CH_2I$ |
| $K_3B_{12}H_4Cl_6(SC_{12}H_{25})_2$ | $Br(CH_2)_6Br$ |
| $MgB_{10}Br_3(SC_2H_5)_2$ | $p\text{-}BrCH_2CH_2C_6H_4CH_2CH_2Br$ |
| $Cs_2B_{10}H_8(p\text{-}SC_6H_4CH_3)_2$ | $BrCH_2CH_2CH_2OCH_2CH_2CH_2Br$ |
| $Rb_2B_{10}H_8(SC_6H_{11})_2$ | $Br(CH_2)_5SO_2(CH_2)_5Br$ |

EXAMPLE 23

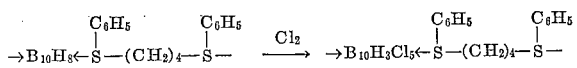

Chlorine was bubbled through a mixture of 2 g. of a polymer having the repeating unit shown in the left side of the above equation (Example 17) and 30 ml. of carbon tetrachloride. An exothermic reaction took place, and the temperature rose to 35° C. in about five minutes. When the temperature dropped below 35° C. (after 10–15 minutes), the mixture was heated to boiling (about 75° C.) and held at this temperature for about 10 minutes. The flow of chlorine, which had been maintained throughout, was stopped, and the volatile material was evaporated from the mixture under reduced pressure. The solid thus obtained was a chlorinated polymer containing repeating units of the type shown on the right side of the above equation. It softened at 190° C. and melted at 210° C.

*Analysis.*—Calcd. for $C_{16}H_{21}B_{10}Cl_5S_2$: Cl, 31.5. Found: Cl, 30.47.

EXAMPLE 24

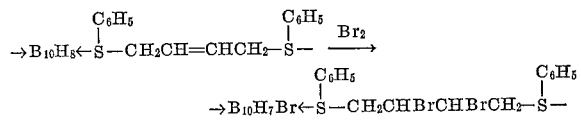

A mixture of 1.0 g. of a polymer containing the recurring unit shown on the left side of the above equation (Example 20) and 30 ml. of carbon tetrachloride was heated to reflux (about 75° C.). Enough bromine was added to the mixture at this temperature to produce a deep red color, and this mixture was refluxed for two hours. During this time more bromine was added as necessary to maintain the red color. Volatile material was removed by evaporation to give a brominated polymer containing the repeating unit shown on the right side of the above equation.

*Analysis.*—Calcd. for $C_{16}H_{23}B_{10}Br_3S_2$: Br, 31.6. Found: Br, 30.47.

Infrared absorption characteristic of C=C, which was present in the unhalogenated polymer, was completely absent in the product.

EXAMPLE 25

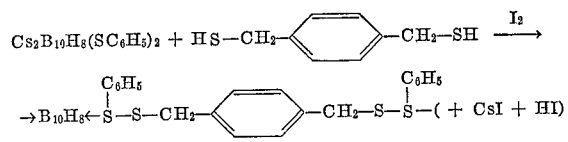

A solution of 2.032 g. of iodine in 10 ml. of dimethylacetamide was added dropwise to a solution of 1.416 g. of $Cs_2B_{10}H_8(SC_6H_5)_2$ and 0.34 g. of $\alpha,\alpha'$-p-xylenedithiol in 10 ml. of dimethylacetamide. The mixture was heated at 50° C. for five minutes and cooled, and the solid cesium iodide that had formed was removed by filtration. A crude product was precipitated by pouring the filtrate into excess water, filtering, and drying. It was dissolved in chloroform, and a small amount of insoluble material was removed by filtration. Evaporation of the chloroform gave a polymer containing the repeating unit shown on the right side of the above equation.

EXAMPLE 26

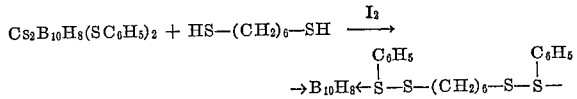

A polymer containing the repeating unit shown on the right side of the above equation was obtained by the method of Example 25, 0.236 g. of 1,6-hexanedithiol being substituted for the $\alpha,\alpha'$-p-xylenedithiol.

Similarly, $Na_2B_{12}H_{10}(SC_8H_{17})_2$ and

$MgB_{12}Br_{10}(SCH_2C_{10}H_7)_2$ and $HS(CH_2)_{10}SH + I_2$ $CaB_{10}H_4Cl_4(SC_4H_9)_2$ and

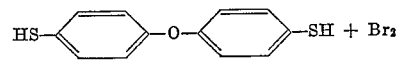

may be reacted to prepare polymers of the invention.

EXAMPLE 27

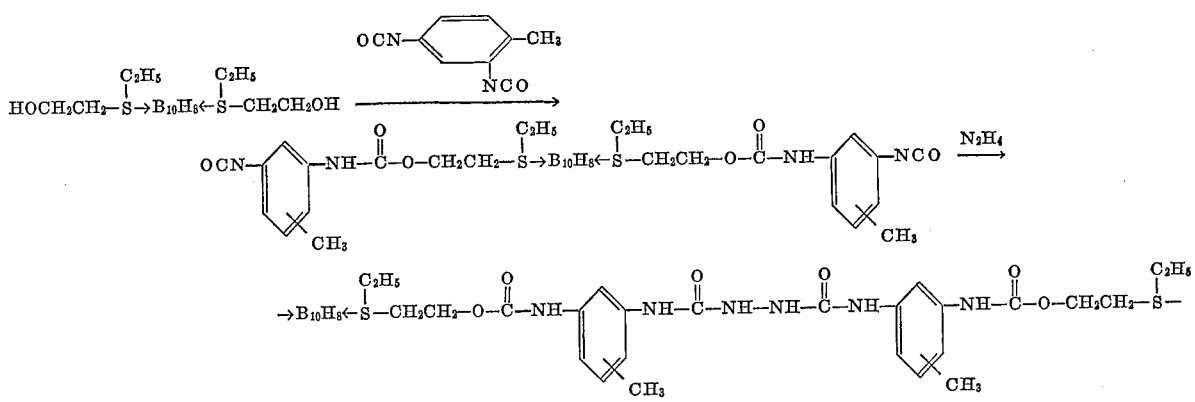

2,4-tolylene diisocyanate (7.41 g.) was dissolved in a solution of 6.77 g. of $B_{10}H_8(C_2H_5S—CH_2CH_2OH)_2$ in 25 ml. of dimethylacetamide, and the solution was allowed to stand at room temperature for about 18 hours. By this time the infrared absorption characteristic of hydroxyl groups, originally present in the solution, had disappeared and new absorption characteristic of a urethan N–H group had appeared. To this solution was added a solution of 1.06 g. of hydrazine hydrate in 10 ml. of dimethylacetamide. The temperature immediately rose to about 50° C. because of the exothermic reaction, and the viscosity of the solution increased. These observations accord with the formation of a polymer. The mixture was allowed to stand for one hour, after which a portion of it was poured into excess water, whereupon a white solid precipitated. It was separated by filtration, washed thoroughly with water, and dried. The product was a polymer having a repeating unit similar to that shown in the above equation.

Another portion of the dimethylacetamide solution of the polymer was flowed out on a glass plate, and solvent was evaporated at 90° C. A clear, hard, well-adhering protective coating of the polymer was thus obtained.

EXAMPLE 28

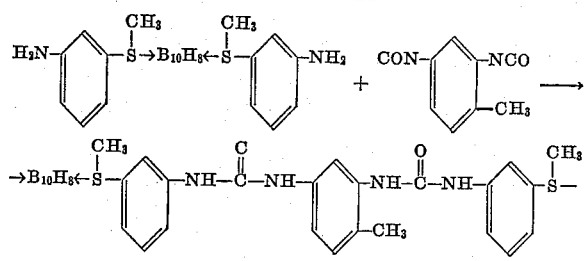

To a solution of 3.28 g. of

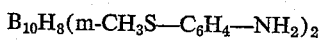

in 25 ml. of pyridine was added 1.75 g. of 2,4-tolylene diisocyanate with vigorous stirring. The solution quickly became more viscous, which behavior is characteristic of polymer formation. It was allowed to stand at room temperature for about 18 hours. It was poured into 50 ml. of water, and 5 ml. of concentrated hydrochloric acid was added to the milky liquid that resulted. The solid that precipitated was separated by filtration, washed with water, and dried at 80° C. under reduced pressure over $P_2O_5$. It was a polymer having the repeating unit shown in the above equation.

*Analysis.*—Calcd. for $C_{23}H_{32}B_{10}N_4O_2S_2$: C, 48.5; H, 5.63; B, 19.0. Found: C, 48.28; H, 5.97; B, 16.53.

The inherent viscosity of the polymer was 0.11 (0.1% solution in pyridine at 25° C.).

Using the above procedure,

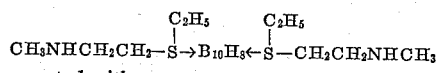

may be reacted with

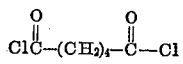

and

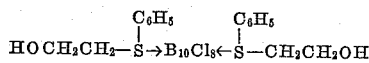

with

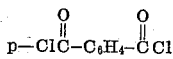

to obtain their polymeric products.

EXAMPLE 29

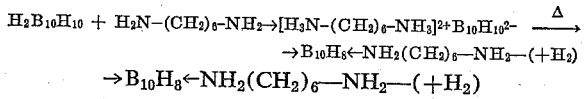

A solution of $H_2B_{10}H_{10}$ (7.199 ml. of a 2.536-molar solution) and 2.1179 g. of hexamethylenediamine in 15 ml. of water was warmed to 60° C., cooled, and concentrated nearly to dryness at ordinary temperature and reduced pressure. The salt thus obtained was dried at 100° C./0.1 mm. It was then heated at 165° C./0.1 mm. for 3 days and 8 hours, to give a polymer having the repeating unit shown in the right side of the above equation. The inherent viscosity of the polymer (0.25% in dimethylformamide at 25° C.) was 0.21.

EXAMPLE 30

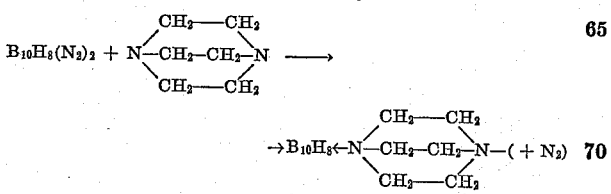

A solution of 0.6657 g. of $B_{10}H_8(N_2)_2$ and 0.4330 g. of triethylenediamine in 20 ml. of benzene was heated at 80° C. for 24 hours. The temperature of the mixture was raised to 85–89° C. and held there for 48 hours, during which time essentially all the benzene distilled from the mixture. The residual material was heated at 200° C. and autogenous pressure in a sealed glass reactor for five hours. The product obtained on cooling and opening the reactor was a polymer having the repeating unit shown on the right side of the above equation.

*Analysis.*—Calcd. for $C_6H_{20}B_{10}N_2$: C, 31.5; H, 8.8; N, 12.3. Found: C, 32.0; H, 8.4; N, 10.4.

The infrared absorption spectrum of the polymer (mineral-oil mull) showed complete absence of absorption characteristic of the diazonium group at about 4.4 μ.

EXAMPLE 31

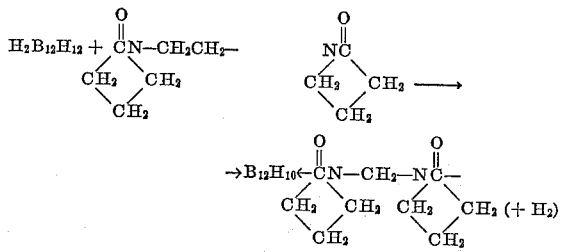

In an atmosphere of nitrogen, an intimate mixture of 2.5 g. of a hydrate of $H_2B_{12}H_{12}$ containing approximately 5.3 moles of water of hydration and 18.5 g. of N,N'-ethylene-bis(γ-butyrolactam) was heated rapidly to 150° C. The temperature was raised to 170° C. over a period of 20 minutes and held at 170–175° C. for 28 hours and 40 minutes. Evolution of hydrogen was observed when the temperature reached 170° C. and continued for at least 40 minutes thereafter. The reaction mixture was heated at 100° C./0.1 mm. for 38 hours, to give a polymer having the repeating unit shown on the right side of the above equation. The inherent viscosity of the polymer (0.25% in dimethylformamide at 25° C.) was 0.11.

The polymers of the invention have many wide and useful applications. Generically, they are useful as protective coatings on surfaces such as glass or steel. The polymers can be molded into shaped articles from solution or by thermal techniques. The molded articles so produced find many applications, for example, as light-transparent neutron barriers or space-vehicle windows resistant to outer-space radiation.

In addition, the polymers of the invention are generically useful as components of solid high-energy fuels.

Polymers having molecular weights of 10,000 or more can be spun into fibers which find usefulness in a broad range of textiles.

Moreover, the polymers may be used as treating agents for other polymers to improve the adhesion properties of the latter polymers. For example, a polyethylene terephthalate film was dipped in a 1% solution of the polymer of Example 31 in dimethylformamide. Excess liquid was drained from the film, which was then allowed to dry in air. The film was laminated to a film of low-density polyethylene at 200° C./300 lb./sq. in./5 min. The resulting laminate was clear and smooth. Its adhesion (the force necessary to separate the two films) was 200–300 g./in., whereas a control laminate made from untreated polyethylene terephthalate film had an adhesion of less than 50 g./in.

In addition, the polymers of the invention can be used to improve the dyeability of fabrics, for example, a semi-dull polyethylene terehpthalate fabric was soaked in a 1% solution of the above polymer in dimethyl formamide. Excess liquid was pressed from the fabric which was then heated for five minutes in an oven at 195° C., rinsed for two hours in running tap water at 60° C., and air-dried. The dyeability of the fabric thus treated was significantly better than that of an untreated control when it was treated with the following dyes by conventional dyeing methods: Dye No. 24,895 of the "Colour Index," Second Edition, Dye No. 62,085, Dye No. 23,635, Dye No. 28,160, the dye of Example II of Brit. 807,241, and the dye of Example VIII and claim 3 of U.S. 2,821,526.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A polyboron polymer having the recurring structure

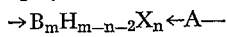

wherein $m$ is a cardinal number selected from the class consisting of 10 and 12; $n$ is a cardinal number of from 0 to $m$-2, inclusive; A is selected from the class consisting of biscarboxamides, bis-sulfonamides, bis(thio ethers), bisdisulfides, bis-sulfones, and when $m$ is 10, diamines and dinitriles; and X is a group selected from the class consisting of halogen and hydrocarbyl free of aliphatic unsaturation.

2. A polyboron polymer having the recurring structure

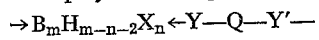

wherein X is a group selected from the class consisting of halogen and aliphatically saturated hydrocarbyl; $m$ is a cardinal number selected from the class consisting of 10 and 12; $n$ is a cardinal number of from 0 to $m$-2, inclusive; Y and Y' each are selected from the class consisting of

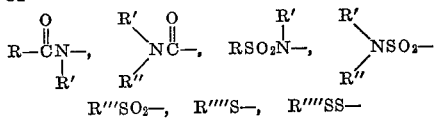

and when $m$ is 10,

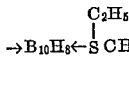

wherein R and R' each are selected from the class consisting of hydrogen and aliphatically saturated hydrocarbyl, and taken together is an alkylene radical, R'' is of the class consisting of hydrogen and aliphatically saturated hydrocarbyl bonded through aliphatic carbon, R''' is aliphatically saturated hydrocarbyl, and R'''' is of the class consisting of aliphatically saturated hydrocarbyl and substituted aliphatically saturated hydrocarbyl; and Q is selected from the class consisting of (a) when Y and Y' are R''''S, a divalent hydrocarbyl group free of acetylenic and allenic unsaturation,
(b) when Y and Y' are any of the nine groups defining Y and Y' other than R''''S, a divalent hydrocarbyl group free of aliphatic unsaturation which can be interrupted by an oxygen atom,
(c) when $m$ is 10 and Y and Y' are R''''S, a divalent hydrocarbyl group free of acetylenic and allenic unsaturation which can be interrupted by up to four groups of the class consisting of

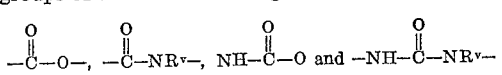

wherein $R^v$ is of the class consisting of hydrogen and lower alkyl, and (d) when Y and Y' are of the class consisting of

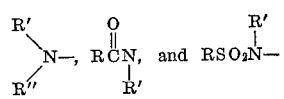

a divalent alkylene group in which R' of Y and R' of Y' may be joined to form a divalent alkylene group, and the R'' of Y and R'' of Y' may be joined to form a divalent alkylene group.

3. A polymer of claim 2 wherein Y and Y' are R''''S—.
4. A polymer of claim 2 wherein X is halogen, and $n$ is 8.
5. A polymer of claim 2 wherein $n$ is 0.
6. A polymer of claim 2 wherein $m$ is 10.
7. A polymer of claim 2 wherein $m$ is 12.
8. A polymer of claim 2 wherein $m$ is 10, $n$ is 8 and X is chlorine.
9. A polymer having the recurring structure

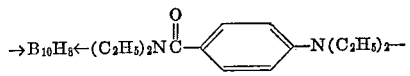

10. A polymer having the recurring structure

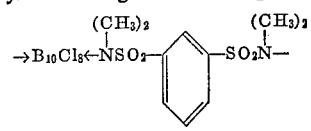

11. A polymer having the recurring structure

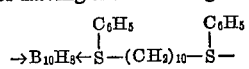

12. A polymer having the recurring structure

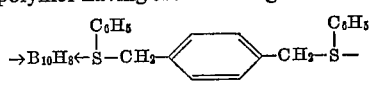

13. A polymer having the recurring structure

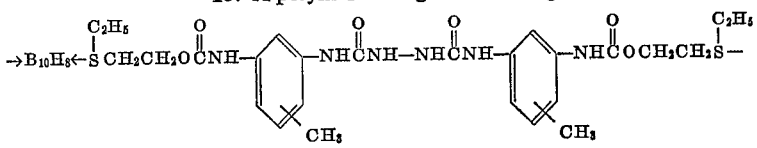

14. A polymer having the recurring structure

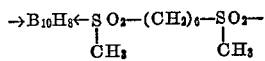

15. A polymer having the recurring structure $$\rightarrow B_{10}H_8 \leftarrow NC-(CH_2)_4-CN-$$

16. A polymer having the recurring structure

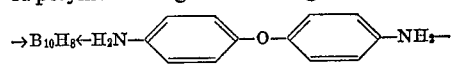

17. A process for preparing a neutral polyboron polymer having the recurring structure

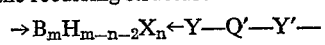

wherein X is of the class consisting of halogen and aliphatically saturated hydrocarbyl, $m$ is a cardinal number of the class consisting of 10 and 12, $n$ is a cardinal number of from 0 to $m$–2, inclusive, Q' is a divalent aliphatically saturated hydrocarbyl group which can be interrupted by an oxygen atom, and Y and Y' are of the class consisting of

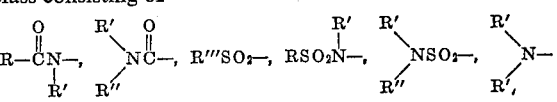

and NC—, wherein R and R' each are selected from the class consisting of hydrogen and aliphatically saturated hydrocarbyl, R'' is of the class consisting of hydrogen and aliphatically saturated hydrocarbyl bonded through aliphatic carbon, and R''' is aliphatically saturated hydrocarbyl; which comprises reacting a compound of the formula $M_2B_mH_{m-n}X_n$ wherein M is a monovalent cation of the class consisting of hydrogen, ammonium, and substituted ammonium having up to three hydrocarbyl substituents, said substituents being hydrocarbyl free of aliphatic unsaturation and having up to 12 carbon atoms, and X, m, and n are defined as above, with a compound of the class consisting of

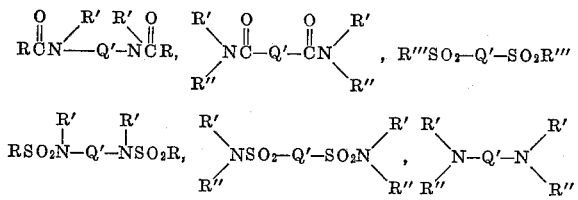

and NC—Q'—CN wherein Q', R, R', R" and R''' are defined as above, at a temperature between 80° and 250° C.

18. A process for preparing a neutral polyboron polymer having the recurring structure

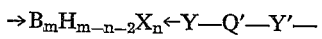

wherein X is of the class consisting of halogen and aliphatically saturated hydrocarbyl, m is a cardinal number of the class consisting of 10 and 12, n is a cardinal number of from 0 to m–2, inclusive, Q' is a divalent aliphatically saturated hydrocarbyl group which can be interrupted by an oxygen atom, and Y and Y' are R''''S—, wherein R'''' is of the class consisting of aliphatically saturated hydrocarbyl and substituted aliphatically saturated hydrocarbyl; which comprises reacting a compound of the formula $M_2B_mH_{m-n}X_n$ wherein M is a cation of the class consisting of hydrogen, ammonium, and substituted ammonium having up to three hydrocarbyl substituents, said substituents being hydrocarbyl free of aliphatic unsaturation and having up to 12 carbon atoms, and X, m and n are defined as above, with a compound of the formula

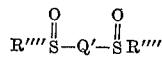

wherein Q' and R'''' are defined as above, in the presence of a lower alkanoic acid and a strong mineral acid at a temperature between 25° and 250° C.

19. A process for preparing a neutral polyboron polymer having the recurring structure

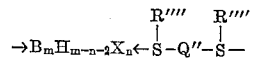

wherein X is of the class consisting of halogen and aliphatically saturated hydrocarbyl, m is a cardinal number selected from the class consisting of 10 and 12, n is a cardinal number of from 0 to m–2, inclusive, R'''' is aliphatically saturated hydrocarbyl which may contain substituents from the class consisting of halogen and amino, and Q'' is divalent hydrocarbyl free of acetylenic and allenic unsaturation which may be interrupted by an oxygen atom and which is bonded to the sulfur (S) through saturated carbon; which comprises reacting a compound of the formula $(M^{v+})_a[B_mH_{m-n-2}X_n(SR'''')_2]_b$ wherein M' is a cation of the class consisting of alkali metals and alkaline-earth metals, v is the valence of M, a and b are the smallest whole numbers satisfying the equation $a=2b/v$, and X, m, and n are defined as above, with a compound of the formula X'—Q''—X' wherein X' is halogen and Q'' is defined as above.

20. A process for preparing a neutral polyboron polymer having the recurring structure

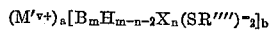

wherein X is of the class consisting of halogen and aliphatically saturated hydrocarbyl, m is a cardinal number selected from the class consisting of 10 and 12, n is a cardinal number of from 0 to m–2, inclusive, R'''' is aliphatically saturated hydrocarbyl which may contain substituents from the class consisting of halogen and amino and Q' is divalent aliphatically saturated hydrocarbyl which can be interrupted by an oxygen atom; which comprises reacting, at a temperature between 0° and 150° C., a compound of the formula $(M'^{v+})_a[B_mH_{m-n-2}X_n(SR'''')_2=]_b$ wherein M' is a cation of the class consisting of alkali metals and alkaline-earth metals, v is the valence of M, a and b are the smallest whole numbers satisfying the equation $a=2b/v$, and X, m, n and R'''' are defined as above, with a compound of the formula HS—Q'—SH in the presence of a compound capable of oxidizing a thiol to a disulfide.

21. A process for preparing neutral polyboron polymers of the recurring structure

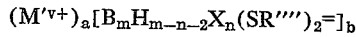

wherein X is of the class consisting of halogen and aliphatically saturated hydrocarbyl, n is a cardinal number of from 0 to 8, inclusive, R''' is aliphatically saturated hydrocarbyl, R^{v'} is of the class consisting of lower alkylene and phenylene, Q''' is divalent aliphatically saturated hydrocarbyl, and the U's are the same and are of the class consisting of

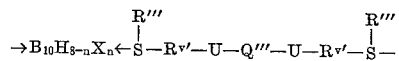

wherein R^v is of the class consisting of hydrogen and lower alkyl; which comprises reacting a compound of the formula $\rightarrow B_{10}H_{8-n}X_nZ'_2$ wherein Z' is an aliphatically saturated hydrocarbyl sulfide in which one hydrocarbyl group is substituted with a group selected from the class consisting of hydroxyl and amino in which the nitrogen bears at least one hydrogen, with an aliphatically saturated hydrocarbon substituted with two identical groups of the class consisting of isocyanato and halocarbonyl.

22. A process for preparing neutral polyboron polymers of the recurring structure

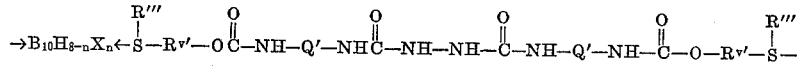

wherein X is of the class consisting of halogen and aliphatically saturated hydrocarbyl, n is a cardinal number of from 0 to 8, inclusive, R^{v'} is of the class consisting of lower alkylene and phenylene and Q' is a divalent hydrocarbyl group free of aliphatic unsaturation which may be interrupted by an oxygen atom; which comprises reacting a compound of the formula

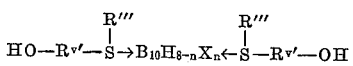

with a compound of the formula

OCN—Q'—NCO at room temperature, reacting the resulting product with hydrazine hydrate, and isolating the above-designated polymer.

No references cited.

WILLIAM H. SHORT, *Primary Examiner.*

M. GOLDSTEIN, *Assistant Examiner.*

UNITED STATES PATENT OFFICE
CERTIFICATE OF CORRECTION

Patent No. 3,344,108　　　　　　Dated September 26, 1967'

Inventor(s) William C. Drinkard, Jr.

It is certified that error appears in the above-identified patent and that said Letters Patent are hereby corrected as shown below:

Col. 3, line 22, correct the spelling of -- pyrrolidones --;

Col. 5, line 51, change "diisocyanato - diphenylmethane" to -- diisocyanatodiphenylmethane --;

Col. 8, line 50, separate "$B_{10}$" from the title;

Col. 9, line 50, reverse the parenthesis at the end of the line;

Col. 15, line 69, change "N.N' " to -- N,N' --;

Col. 16, line 35, correct the spelling of -- separated -- Example 17, the term "$CO_2$" in the second formula in the equation should be changed to read -- $CH_2$ --;

Col. 21, Example 28, the first term in the second formula in the equation should be changed to read -- OCN --; and Col. 24, Claim 9, there should be a $\overset{O}{\underset{}{C}}$ group between the ring and the nitrogen of "$N(C_2H_5)_2$".

Signed and sealed this 23rd day of May 1972.

(SEAL)
Attest:

EDWARD M. FLETCHER, JR.　　　　　ROBERT GOTTSCHALK
Attesting Officer　　　　　　　　Commissioner of Patents